United States Patent
Walter et al.

[11] Patent Number: 5,856,788
[45] Date of Patent: *Jan. 5, 1999

[54] METHOD AND APPARATUS FOR RADIOFREQUENCY IDENTIFICATION TAGS

[75] Inventors: Ronald Walter, Anaheim; Keith Vertrees, San Diego, both of Calif.

[73] Assignee: Single Chips Systems Corp., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 628,872

[22] Filed: Mar. 12, 1996

[51] Int. Cl.⁶ .................. G06F 3/00; G06F 7/00
[52] U.S. Cl. .................. 340/825.54; 340/825.49; 340/505; 340/568; 235/375; 235/380; 342/44; 342/51
[58] Field of Search .......... 340/825.54, 825.49, 340/505, 568, 572, 825.34, 825.35, 825.02, 825.08; 235/375, 380; 342/44, 51

[56] References Cited

U.S. PATENT DOCUMENTS

| | | | |
|---|---|---|---|
| 4,071,908 | 1/1978 | Brophy et al. | 364/900 |
| 5,339,073 | 8/1994 | Dodd et al. | 340/825.31 |
| 5,469,142 | 11/1995 | Bergman et al. | 340/572 |
| 5,479,416 | 12/1995 | Snodgrass et al. | 371/37.1 |
| 5,583,819 | 12/1996 | Roesner et al. | 365/225.7 |
| 5,602,538 | 2/1997 | Orthmann et al. | 340/825.54 |

OTHER PUBLICATIONS

Plug and Play ISA Specification by Intel Corp. and Microsoft (c)1993, 1994 (Mar.).

Primary Examiner—Michael Horabik
Assistant Examiner—Yonel Beaulieu
Attorney, Agent, or Firm—Daniel L. Dawes

[57] ABSTRACT

A method and apparatus for determining the identification number or any other information within a plurality of radiofrequency identification tags within a common field of interrogation utilizes a combination of an isolation state into which the tags may be placed together with bitwise interrogation of the identification number or information followed by selective deactivation. A first bit in the identification number or information is interrogated of all the tags in the field. If any tag responds that the bit is a 1, a 1 is entered into an ID register in a reader and all tags in which a 0 exists in that bit position are deactivated. The process continues until only one tag remains activated. The last activated tag at this point has been completely read and is then placed in an isolated state. The process is begun anew with the remaining nonisolated tags until all tags have been read.

24 Claims, 3 Drawing Sheets

ZERO

ONE

METHOD AND APPARATUS FOR RADIOFREQUENCY IDENTIFICATION TAGS

BACKGROUND OF THE INVENTION

1. Field of the Invention

The invention relates to the field of radiofrequency identification (RF/ID) tags, and in particular, it relates to methods and apparatus for identification of individual RF/ID tags when multiple tags are present.

2. Description of the Prior Art

RF/ID tags may conflict with one another when responding to a single RF/ID reader since the tags are transmitting on the same frequency within the same time slot. A single request to read multiple tags in a field of interrogation can be expected to generate multiple responses which the reader will be unable to separate or differentiate. Therefore, systems in which individual tags use common time frames and frequencies prohibit the use of more than two such tags in an interrogation zone at the same time. What is needed is a method and apparatus by which this limitation can be overcome.

BRIEF SUMMARY OF THE INVENTION

The invention is a method for obtaining digital information from a plurality of radiofrequency-identification tags simultaneously interrogated on a single communication channel within a field of interrogation. The method comprises the steps of activating the plurality of tags, and bitwise interrogating the activated tags for the digital information within the field of interrogation to obtain a bitwise predetermined response while deactivating each of the tags having a different bitwise response than the bitwise predetermined response until all of the information is obtained. As a result, the information is unambiguously obtained from the plurality of tags in the field of interrogation.

In one embodiment the step of bitwise interrogating the activated tags comprises the step of serially bitwise interrogating the activated tags. In another embodiment, bitwise interrogating the activated tags comprises arbitrarily bitwise interrogating the activated tags without repeating an interrogation of any given bit of the digital information.

It is determined when the digital information has been completely interrogated from one of the plurality of tags and the digital information obtained is verified. The method may be restarted anew if verification fails.

In one embodiment the step of bitwise interrogating the activated tags while deactivating each of the tags having a different bitwise response than the bitwise predetermined response comprises the step simultaneously generating a response signal from those of the plurality of tags having the bitwise predetermined response, and deactivating others of the plurality of tags not having the bitwise predetermined response. For example, a command sent to the tags could cause those tags having a 1 stored in the interrogated bit position to send a one back to the reader, or if they had a 0 stored in the interrogated bit position to deactivate themselves so that they would no longer respond to reader interrogation until reactivated by the reader by an AWAKE command.

In another embodiment the step of bitwise interrogating the activated tags while deactivating each of the tags having a different bitwise response than the bitwise predetermined response comprises a first step of generating a response signal from those of the plurality of tags having the bitwise predetermined response. A subsequent step is taken for deactivating others of the plurality of tags not having the bitwise predetermined response when the reader sends out a SLEEP command.

The method further comprises verifying the bitwise response bit by bit from the plurality of tags to reduce error of bitwise communication of the information. Verification is made by consecutive repetition of the bit interrogations and responses until a predetermined degree of consistency is realized. In addition the method further comprises verifying the completed information or entire word from the last remaining activated tag to reduce error of communication of the completed information. Again verification is practiced by a redundant read with a predetermined degree of realized consistency.

After a tag is completely and reliably read the method further comprises isolating the read tag to prevent its continued response to interrogation when unread ones of the plurality of tags are subsequently interrogated. In the illustrated embodiment this is achieved by the reader sending out a command which sets a flag as ISOLATED in the last active tag. Thereafter, only tags in which the flag is set at NOT ISOLATED can be interrogated or set to the AWAKE state.

The method further comprises the step of determining when the digital information has been completely interrogated from one of the plurality of tags and verifying the digital information. the method are restarted anew if verification fails.

The invention is also an apparatus for performing the above methodologies. The reader and tags include radiofrequency transceivers, memories and programmable or custom logic circuitry for receiving, responding and implementing the commands and operations of the methods just described.

The invention is alternatively defined as a system for communicating with a plurality of tags within a field of interrogation on a single communication frequency, wherein the plurality of tags communicate in response to interrogation during the same time period, wherein each of the plurality of tags can be set in an activated AWAKE state or deactivated into a SLEEP state, wherein each of the tags contains digital information, and wherein each of the tags can be set in two distinguishable states, an ISOLATED state and NOT ISOLATED state. The system comprises a first circuit for setting all of the tags which are in the NOT ISOLATED state into the activated AWAKE state. A second circuit interrogates each bit in the digital information stored within each of the tags in the activated AWAKE state to determine if the interrogated bit has a predetermined logic value, and if so to cause each tag to generate a predetermined response if the bit has the predetermined value and otherwise to place the tag in the SLEEP state. A third circuit bitwise accumulates the predetermined responses and lack of the predetermined responses by bit-by-bit reading the digital information from one of the plurality of tags. A fourth circuit places each tag from which the digital information has been bitwise completely read into the ISOLATED state so that subsequent operation of the second and third circuit reads each unique codification of the digital information contained within each of the plurality of tags within the field of interrogation. Although formally described here as separate circuits, in the actual implementation the same circuitry or portions thereof may operate under software control to perform the separately recited functions.

In one embodiment the second circuit may generate two separate sequential commands to generate the predetermined response from selected ones of the tags and to deactivate other ones of the tags. In another embodiment the second circuit generates a single command to simultaneously generate the predetermined response from selected ones of the tags and to deactivate other ones of the tags.

Stated still another way the invention is a method for interrogating a plurality of RF/ID tags in a single field of interrogation wherein the RF/ID tags communicate on a single frequency during at least overlapping time periods. The method comprises the steps of bitwise interrogating the plurality of tags to determine if any one of the plurality of tags has a predetermined logic value in a predetermined one of a sequence of bit positions. Each of the tags not having the predetermined logic value in the predetermined one of the sequential bit positions is deactivated. The steps of interrogating and deactivating the plurality tags are repeated until only one tag remains activated. The complete information is then obtained from the only one activated tag. The one activated tag is then isolated after the information is obtained therefrom. Each of the foregoing steps for all tags which are not isolated is repeated until complete information has been read from each of the plurality of tags within the field of interrogation.

Still further the invention is a method for interrogating a plurality of RF/ID tags in a single field of interrogation wherein the RF/ID tags communicate on a single frequency during at least overlapping time periods with a single reader comprising the steps of transmitting a train of synchronization pulses from the reader to the tags. each the synchronization pulse having a predetermined pulse width. $t_1$. and repeated with a predetermined period. $t_2$. The reader transmits digital data to the plurality of tags by transmitting a selected plurality of pulses with a predetermined pulse separation of $t_3$. at a repetition rate with a period of $t_2$. Digital data is transmitted from the plurality of tags to the reader by selectively transmitting a tag data pulse in a selected half of a tag data frame defined by consecutive synchronization pulses transmitted by the reader.

In one embodiment the step of transmitting a train of synchronization pulses is performed by ceasing the transmission of a signal from the reader to the tags for the predetermined pulse width, t1, and repeating the cessation with the predetermined period. t2. The step of transmitting reader digital data from the reader to the plurality of tags comprises transmitting a selected plurality of synchronization pulses to indicate correspondingly selected logical values. The step of transmitting tag digital data from the plurality of tags to the reader comprises transmitting the tag digital data after the last of the reader digital data transmitted from the reader to the tags. The last synchronization pulse comprising the reader digital data defines a first synchronization pulse which defines the beginning of the tag data frame. Two of the synchronization pulses define a first and second half of the tag data frame.

The invention as summarized above can be better visualized by turning to the following drawings wherein like elements are referenced by like numerals.

The invention and its various embodiments may now be understood by turning to the following detailed description.

DETAILED DESCRIPTION OF THE PREFERRED EMBODIMENTS

A method and apparatus for determining the identification number or any other information within a plurality of radiofrequency identification tags within a common field of interrogation utilizes a combination of an isolation state into which the tags may be placed together with bitwise interrogation of the identification number or information followed by selective deactivation. The tags have two binary states or flags, a first state that takes on an AWAKE or SLEEP state in which the tag is activated or deactivated respectively. A second state takes on an ISOLATED or NOT ISOLATED state in which the tag is independently deactivated or activated on that separate state. All tags enter the interrogation field in the AWAKE and NOT ISOLATED states. A first bit in the identification number or information is interrogated of all the tags in the field. If any tag responds that the bit is a 1, a 1 is entered into an ID register in a reader and all tags in which a 0 exists in that bit position are deactivated or put into a SLEEP state. If it should occur that no tag responds that the interrogated bit position is a 1, then a 0 is placed into the ID register in the reader. In this case all tags are left activated or in the AWAKE state. The process continues until only one tag remains activated. The last activated tag at this point has been completely read, it is reread for verification, and is then placed in ISOLATED state. The process is then begun anew with the remaining NOT ISOLATED tags until all tags have been read. It should be expressly understood that the value of the logic state which is queried is arbitrary. For example, it could be just as easily devised to bitwise interrogate for a 0 rather than a 1.

Figure 1:
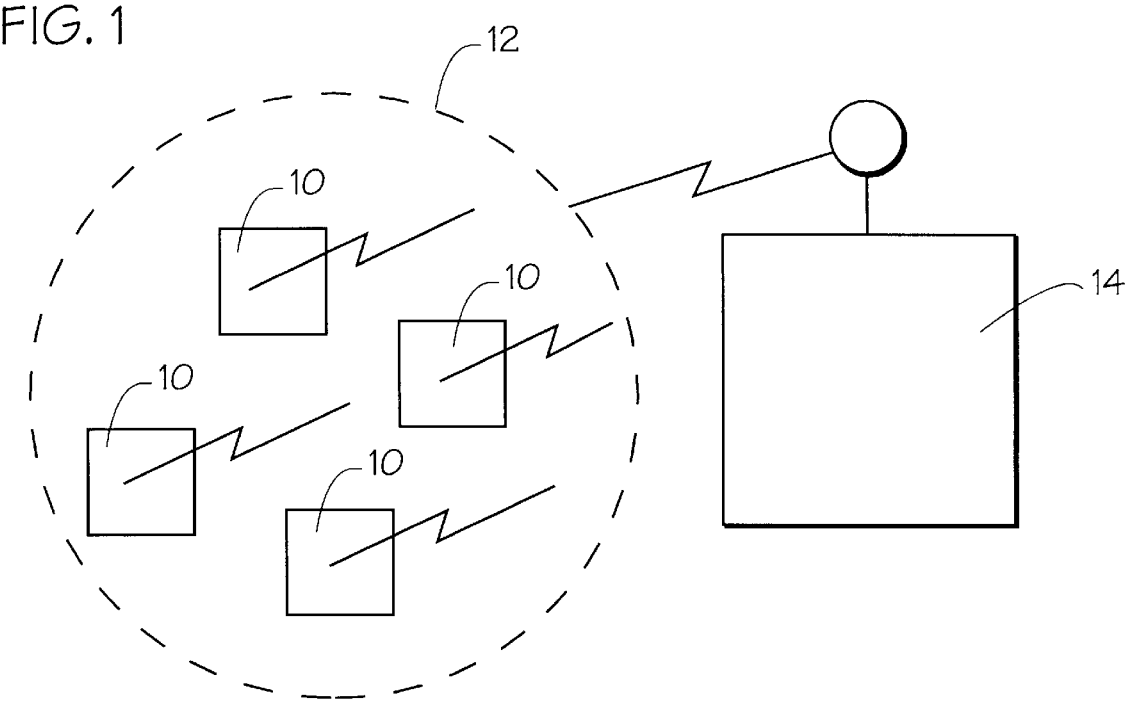
FIG. 1 is a simplified diagram illustrating the situation in which the problem of differentiation between multiple RF/ID tags may arise.

FIG. 1 illustrates a situation in which a plurality of RF/ID tags 10 are present within a zone of interrogation 12 at the same time. The tags are associated or connected with any object desired and may contain any information pertaining to that object as required. For example, each of the tags 10 may be connected to a biological sample in an automated sampling system so that patient, physician, file, and even analysis results and histories are loaded on each of the tags, which are permanently connected to the flask, vile, case, pouch or other container in which the biological sample is carried. An RF/ID reader 14 interrogates the plurality of tags 10 in interrogation field 12 to determine which tags are present at that time and what information is on each tag 10.

In the illustrated method of the invention, a tag 10, when active or powered up, will exist in one of two states, namely in an AWAKE state in which it responds to commands issued by reader 14, or in a SLEEP state in which it does not respond to reader commands. It should be understood that the tag is activated when in the AWAKE state and is deactivated to the SLEEP state so that the terms, activate/AWAKE and deactivated/SLEEP, may be used interchangeably. In addition to the active or inactive states, AWAKE and SLEEP, there is subordinate set of states, ISOLATED and NOT-ISOLATED, which are set in response to reader commands as described below.

The methodology of the invention uses a combination of these states to extract unique identification codes or information from each RF/ID tag 10 within interrogation field 12. The method is better understood in connection with the flow diagram of FIG. 2. In step 16 reader 14 directs all tags 10 to an AWAKE status. In step 18, reader 14 then directs all tags 10 which are NOT ISOLATED to send a 1 bit. All tags 10 which are ISOLATED are directed at step 20 to go to the SLEEP state.

Starting with the mth bit of the identification number stored within each tag 10, which nominally may be the first or last bit, each tag 10 is directed at step 22 to respond to reader 14 by sending a 1 if the mth bit of the identification number contains a 1. If reader 14 receives any response, then it is known that at least one responding tag 10 contains an identification number with a 1 at the mth bit position. A 1 will then be loaded by reader 14 into a buffer or memory location. It is immaterial whether reader 14 saves the scanned information into a buffer, register or memory location. Any kind of memory device or means for saving the identification code or information may be used by reader 14 and will hereinafter be interchangeably described by any one of them. If no responses are received, then it is known that all tags which are in the AWAKE state have a 0 at this bit position. Reader 14 will then load a 0 into the buffer or memory location for this bit position. If a 1 was received, reader 14 directs the tags with a 0 in the mth position to go to the SLEEP state.

A check is made at step 28 to determine if the complete identification or information scan has been achieved. If the bitwise scan is not complete reader 14 then varies m to the next bit position at step 26 and returns to step 22. The illustrated embodiment describes an incrementation of m from low to high, but there is no requirement that the bit positions be scanned from low to high, from high to low or in any sequential or specific order. The bit positions could be processed in a random order if desired. A check is then made at step 27 to determine if the complete null identification code is received which indicates that the bitwise scan has been completed and that there were no tags 10 in field 12 which were NOT ISOLATED or perhaps even present.

The bitwise interrogation process of steps 22–26 continues until all the bits have been interrogated. At this point, reader 14 will have the identification code of one of the tags in interrogation field 12 loaded into its buffer or memory location, and only this tag is in the AWAKE state. Reader 14 then sets this last tag as ISOLATED in step 30. Steps 16 through 28 are then repeated until all the tags in the field have been identified in this manner.

A specific example will make this clear. Note however that any tag entering the filed of interrogation normally enters in the ASLEEP, NOT ISOLATED state. In Table 1 below, assume there are four tags A–D each having a unique 4-bit identification code as shown in the example of Table I. Assume that the mth bit, the first bit interrogated, is the first or leftmost bit and that the interrogation then continues to the right in Table 1.

TABLE 1

Identification Codes in illustrated Example

| Tag | Bit 1 | Bit 2 | Bit 3 | Bit 4 |
|-----|-------|-------|-------|-------|
| A   | 1     | 0     | 0     | 1     |
| B   | 0     | 1     | 0     | 1     |

TABLE 1-continued

Identification Codes in illustrated Example

| Tag | Bit 1 | Bit 2 | Bit 3 | Bit 4 |
|-----|-------|-------|-------|-------|
| C   | 0     | 1     | 1     | 0     |
| D   | 1     | 0     | 1     | 1     |

At step 16, all tags A–D are set to an AWAKE state. Assume for the sake of illustration that one of the tags, tag C, is ISOLATED and that tags A, B, and D are NOT ISOLATED. See Table 3 below for the status of the ISOLATED and NOT ISOLATED flags. Tags A, B, and D are therefore directed by reader 14 to send a 1 at step 18. It is now known that there are NOT ISOLATED tags in interrogation field 12. Reader 14 then directs all the ISOLATED tags, namely tag C, to go asleep at step 20 in FIG. 2 in the first cycle as shown in Table 2.

TABLE 2

Status of the SLEEP Flag

| Tag | cycle 1 step 20 | cycle 1 step 24 | cycle 1 step 22 | cycle 2 step 16 | cycle 2 step 24 | cycle 3 step 18 |
|-----|-----------------|-----------------|-----------------|-----------------|-----------------|-----------------|
| A   | 0               | 0               | 1               | 0               | 0               | 1               |
| B   | 0               | 1               | 1               | 0               | 1               | 0               |
| C   | 1               | 1               | 1               | 1               | 1               | 1               |
| D   | 0               | 0               | 0               | 1               | 1               | 1               |

TABLE 3

Status of ISOLATED Flag

| Tag | cycle 1 | cycle 2 | cycle 3 | cycle 4 |
|-----|---------|---------|---------|---------|
| A   | 0       | 0       | 1       | 1       |
| B   | 0       | 0       | 0       | 1       |
| C   | 1       | 1       | 1       | 1       |
| D   | 0       | 1       | 1       | 1       |

Those tags which are AWAKE, namely tags A, B and D in the example, are now directed at step 22 to transmit a 1 if the value of the first bit is 1. Thus tags A and D each transmit a 1. Reader 14 thus places a 1 in the first bit of the identification register 48, since it knows that there is at least one tag in field 12 having a 1-bit in the first position. Reader 14 at step 24 then directs all tags then in the AWAKE state which have a 0 in the first position, namely tag B, to go to the SLEEP state as shown in Table 2.

There are two tags still in the AWAKE state in field 12, namely tags A and D, as shown in Table 2. The bit index is incremented at step 26 and then the second bit in the tags then in the AWAKE state is interrogated. In this case both tags A and D have a 0 in the second bit position. Since reader 14 receives no response to the interrogation step 22, a 0 is then placed in the second bit position in register 48.

The bit index is incremented then at step 26 and the third bit interrogated at step 22. In this case, tag D, having a 1 in the third bit position, will return a 1. Reader 14 places a 1 in the third bit position of its register 48 and commands tag A which has a 0 in the third bit position to SLEEP. Tag D is now the only tag within the field still in the AWAKE state and still responding to reader commands as shown in Table 2.

The bit index, m, is again incremented at step 26 and the fourth bit of all tags in the AWAKE state are interrogated, which in this case is only tag D. Since tag D has a 1 in the fourth bit, a 1 is then written into register 48 of reader 14 and tag D has been uniquely identified and its ID code read, although there were three NOT ISOLATED tags in field 12 at the beginning of the scan. Since the identity of one tag is known, reader 14 directs this identifiable tag, tag D, to enter the ISOLATED state as shown in the cycle 2 of Table 3. At this point, only tags A and B remain NOT ISOLATED. The process then returns to step 16 and a second cycle begun.

All NOT ISOLATED tags are again set to the AWAKE step at step 16 and those which are NOT ISOLATED. tags A and B, are left in the AWAKE state while the ISOLATED tags, tags C and D, are put to SLEEP as shown in cycle 2 of Table 2. The index bit, m, has been reset to the first position and the first bit position of the AWAKE tags, tags A and B, interrogated. Thus tag A has a 1 in the first bit position. A 1 is returned by tag A and all tags having a 0 in the first position are directed to SLEEP, at step 24, namely tag B as shown in cycle 2 of Table 2. A 1 is placed in the first position of register 48 in reader 14 corresponding to the cycle 2 identification as shown in Table 4.

TABLE 4

Identification of AWAKE Tags

|         |   |   |   |   |       |
|---------|---|---|---|---|-------|
| cycle 1 | 1 | 0 | 1 | 1 | tag D |
| cycle 2 | 1 | 0 | 0 | 1 | tag A |
| cycle 3 | 0 | 1 | 0 | 1 | tag B |

The cycle repeats a third time so that the second bit of all AWAKE tags is then interrogated. However, in this case, only tag A is AWAKE as shown in Table 2 and has a 0 in the position, so tag A does not send a 1 back to reader 14 and reader 14 knows that all tags in the field have a 0 in the second position. A zero is placed in the second bit position in register 48 in cycle 2 as shown in Table 4 and bit index m incremented.

The same situation again occurs and a 0 is placed in the third position finally followed by interrogation in the fourth position of tag A where a 1 is returned and the complete identification code of tag A known. At this point in step 28 tag A is then ISOLATED and control again returned to step 16 for the beginning of cycle 3.

As before in the first step of cycle 3 all the ISOLATED tags, A, C and D are put to SLEEP with only tag B remaining AWAKE. When the first bit position is interrogated, tag B does not respond and reader 14 places a 0 in the first position. Bit index, m then is incremented and second bit position interrogated with tag B returning to 1 causing reader 14 to place a 1 in the second bit position. A signal is sent out by reader 14 to place all other NOT ISOLATED tags having a 0 in the second position to SLEEP. However, in the case of the last tag the only remaining tag has a 1 in the second bit position and therefore remains in the AWAKE state.

The process continues by interrogating a third bit of tag B, which makes no response and therefore sets a 0 in the third position in identification register 48 in reader 14. Finally the fourth bit is interrogated and returns a 1 which allows reader 14 to uniquely identify tag B.

Once again at step 28 at the beginning of cycle 4, tag B is then set at in an ISOLATED state and all NOT ISOLATED tags are directed AWAKE, however there are none. At this point when reader 14 interrogates each bit position no response will be obtained and a 0000 or null tag identification is returned. This tag identification is reserved code to indicate a null return and indicates to reader 14 there are no further tags in field 12 which have not been read during the previous cycle or at some earlier time.

The ISOLATED/NOT ISOLATED bit flag can then be reset at any other later time should tags 10 again need to be read. The process described in connection with FIGS. 1 and 2 in Tables 1–4 reads each tag identification which is unique in field 12. If the identification number and plurality of tags 10 is not unique among the tags, then the methodology identifies the unique sets of identification numbers of tags 10 within field 12. This feature may be used, for example, to identify classes or types of tags present in field 12 where individual identification may not be necessary.

Figure 3:
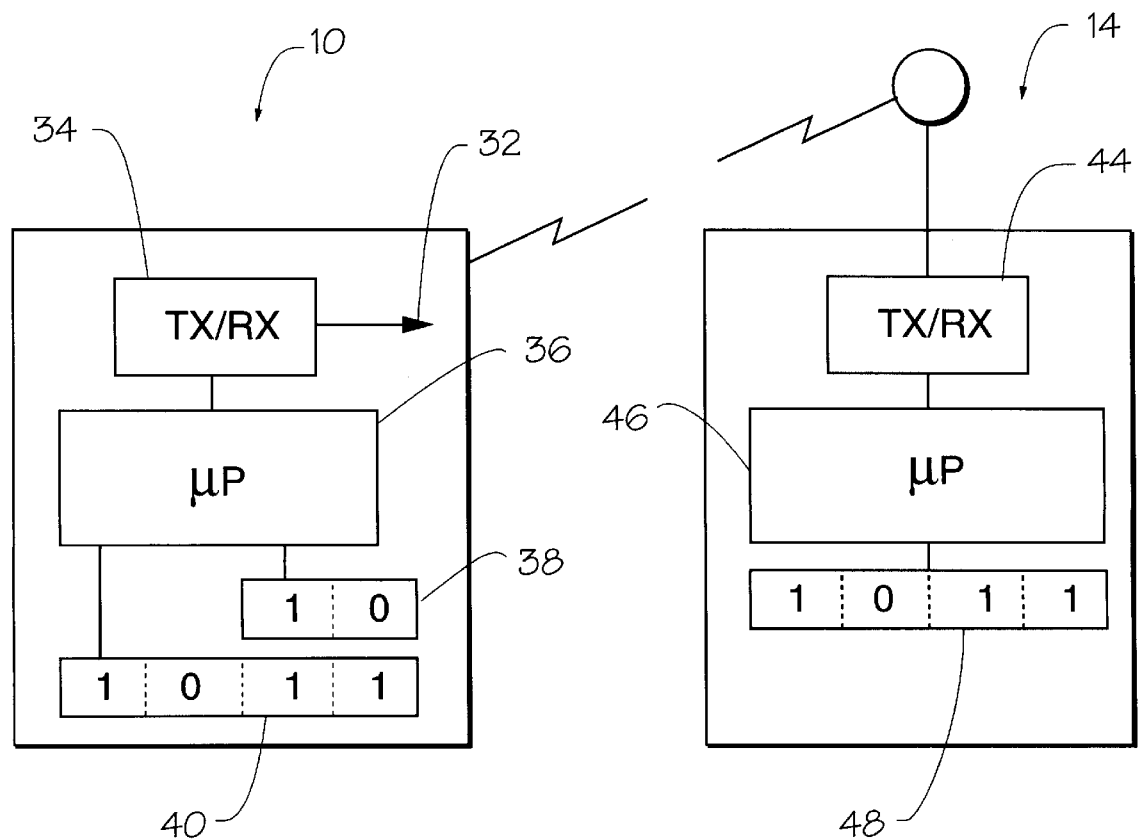
FIG. 3 is a simplified diagrammatic depiction of the functional circuit blocks in the RF/ID devices and reader of FIG. 1.

Any circuit architecture or organization now known or later devised capable of performing the essential method of FIG. 2 can be used. The illustrated embodiment described below is only provided for the purpose of a single example. In the highly diagrammatic view of FIG. 3, each tag 10 includes an antenna or other receiving element 32 coupled to a transceiver circuit 34. Transceiver circuit 34 may include any type of communication and signal conditioning circuitry now known or later devised to perform the functions needed in the situation. Transceiver 34 is coupled to a microprocessor 36, which has among other components at least two memories or a memory with at least two addressable locations, one memory or memory location 38 for holding two flags, namely AWAKE/SLEEP and NOT-ISOLATED/ISOLATED. A second memory or location 40 holds the identification number of tag 10 or other information particular to tag 10.

Reader 14 similarly includes an antenna 42 also coupled to a transceiver 44 and includes any necessary communication or signal conditioning circuitry now known or later devised as may be required in the situation. Transceiver 44 is coupled to a microprocessor 46 which includes at least one register, buffer, memory or memory location 48 at least as large as memory or memory location 40 in which location 48 the information stored in memory or memory location 40 is reassembled in memory or memory location 48 according to the method described above. Conventional software is stored within microprocessors 36 and 46 for implementing the methodology shown in FIG. 2 and illustrated in connection with Tables 1–4.

Many modifications may be made in the process without changing the basic principle of bit-by-bit search. For example, the AWAKE command of step 16 can be skipped if alternate commands are available between reader 14 and tags 10. For example, it has been assumed in the illustrated embodiment that steps 18 and 20 would have to be separate commands from reader 14 in order to be implemented in tags 10. It is also possible that a single command could be devised for tags 10 which would cause them to send a 1 if NOT ISOLATED and otherwise to go to SLEEP if ISOLATED. Therefore, it can be understood that the number of commands which must be issued by reader 14 can be varied according to the design of the instructions set of the system without departing from the spirit and scope of the invention. Therefore, it is to be expressly understood that the methodology is not based on any specific instructions set or any particular communication protocol.

Further, the methodology can be adapted to identify which tags enter the field during the course of the search and to provide an error rate verification. For example, after a tag has been identified, reader 14 can issue a verification command interrogating the full identification number of any tag then remaining AWAKE, which at the end of the search process will be the single uniquely identified tag. The last remaining AWAKE tag can then send its fall ID number and reader 14 can compare it to what has been determined according to the search. This verification can be repeated a number of times until it is reliably determined that there is a match or not with the bit-wise search. If ultimately it is determined that there is no match, then it can be concluded that either there was an error in the communication, as might occur in a noisy field, or that the originally identified tag has permanently left field 12 before reliable verification could be established, or that a new tag entered verification field 12 after the search had begun to identify a previously present tag.

A new entry can always be determined because in the latter case, there will be a conflict of communication when a new NOT ISOLATED tag enters the field and responds to a general verification tag query. Reader 14 will then likely obtain both ones and zeroes transmitted during the same bit positions. In either case, the tag identification can be deleted and the search restarted until unique tag identification and verification has been obtained.

Figure 2:
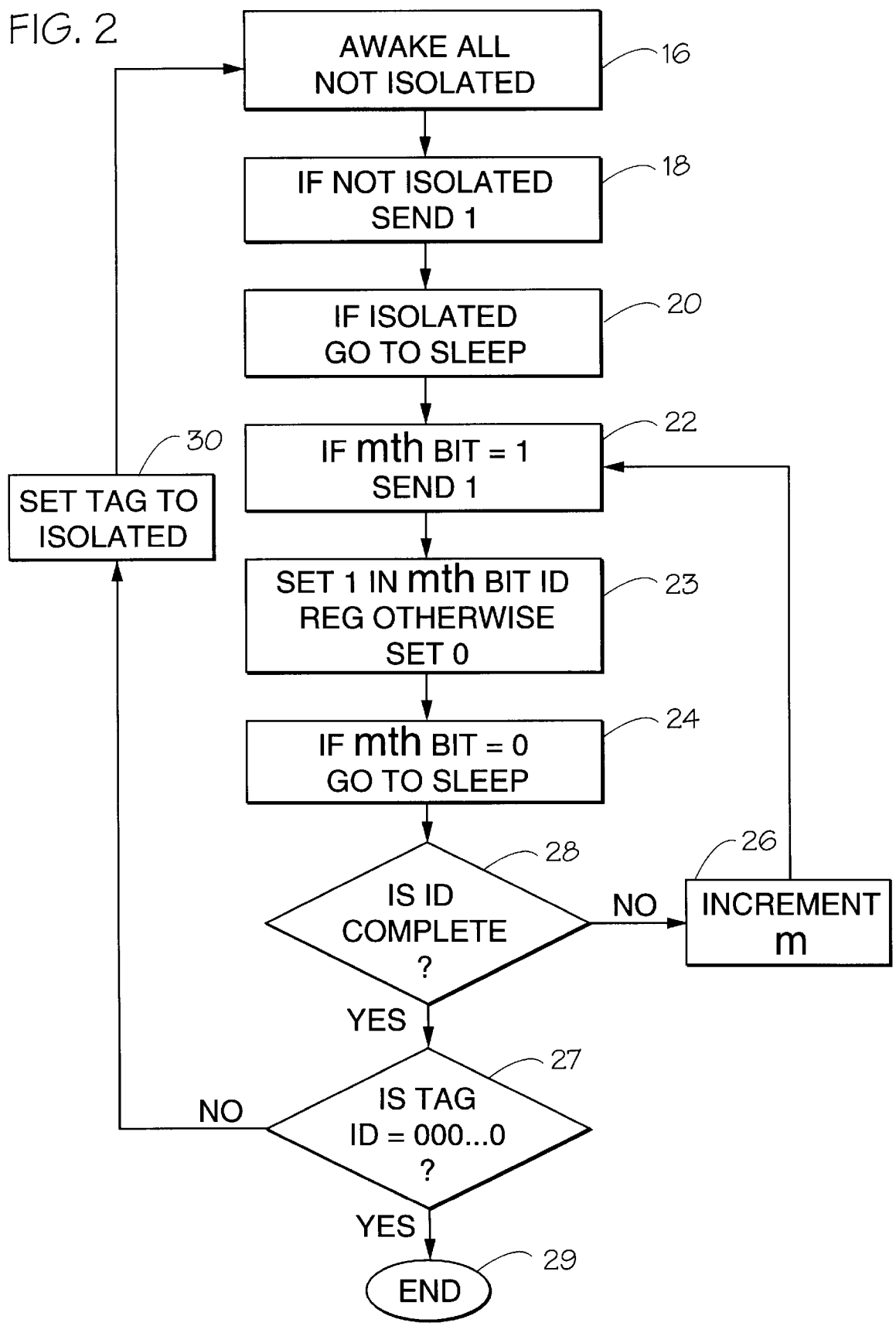
FIG. 2 is a flow diagram illustrating the methodology employed in the reader of FIG. 1.

Further, error rate communication can be assisted by redundant communication of the bitwise communications in FIG. 2. For example, each bit can be transmitted a multiplicity of times and only accepted if a sufficient number of the bitwise communications are identical. If bitwise communication is not reliable either because of a noisy environment or because of high rate of change of tags 10 entering and leaving field 12, the search can be terminated and repeatedly restarted until reliable identification is obtained or timed out.

It should further be noted that the methodology of the invention can be applied to any number of groups of numbers contained within tags 10 and need not per se be used only for identification code. For example, it may be of interest in some applications not to know the particular identity of the tags, but whether any of the tags contain certain kinds of information. Information in specified bit positions can be searched to determine if certain type of content was stored in the tag. Statistical measures could then be taken of tags in the field of their historical content by utilizing the methodology once to identify the content parameter and a second time to identify the identity of the tags having the determined content value.

The communications protocol between reader 14 and tags 10 is based on a series of pulses generated by reader 14 used to synchronize the communication with tags 10. A pulse is defined in this context to be a cessation of transmission by reader 14 for a predefined period of time, $t_1$. This pulse is detected by tags 10 as a loss of signal for a time, $t_1$. The signaling sequence is based on the direction of communication, i.e. reader to tag or vice versa, as well as being synchronized with the rf signal of reader 14. Reader 14 transmits or communicates continuously with tags 10 and periodically ceases for the pulses, $t_1$. The loss of signal is repeated periodically every $t_2$ microseconds. The periodic loss is the synchronization signal or pattern by which communications between reader 14 and tags 10 is ruled.

Figure 4A:
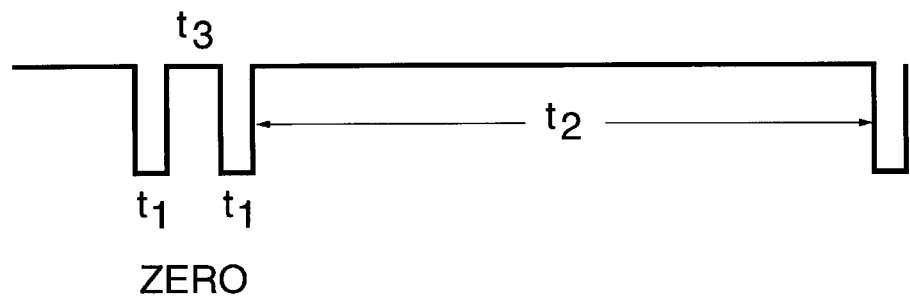
FIG. 4a is a diagrammatic waveform of the communication protocol from the reader to the RF/ID devices of FIG. 1 wherein a zero is transmitted.
Figure 4B:
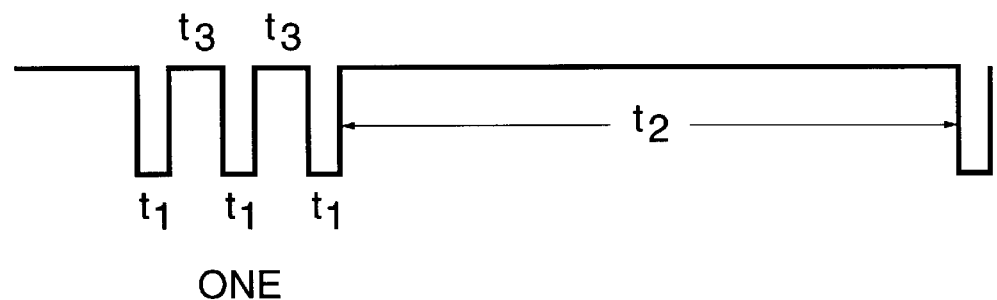
FIG. 4b is a diagrammatic waveform of the communication protocol from the reader to the RF/ID devices of FIG. 1 wherein a one is transmitted.

Reader 14 augments the periodic synchronization signal to communicate a bit string to tags 10 as follows. A "zero" is created by sending two synchronization pulses separated by a time gap, $t_3$, as shown in FIG. 4a. A "one" is created by sending three synchronization pulses separated by a time gap, $t_3$, as shown in FIG. 4b. Information is therefore sent from reader 14 to tags 10 using a series of ones and zeroes based on this pulsing which is diagrammatically illustrated in FIGS. 4a and b. An approximate data bit transfer rate of $1/t_2$ is thus realized.

Figure 5:
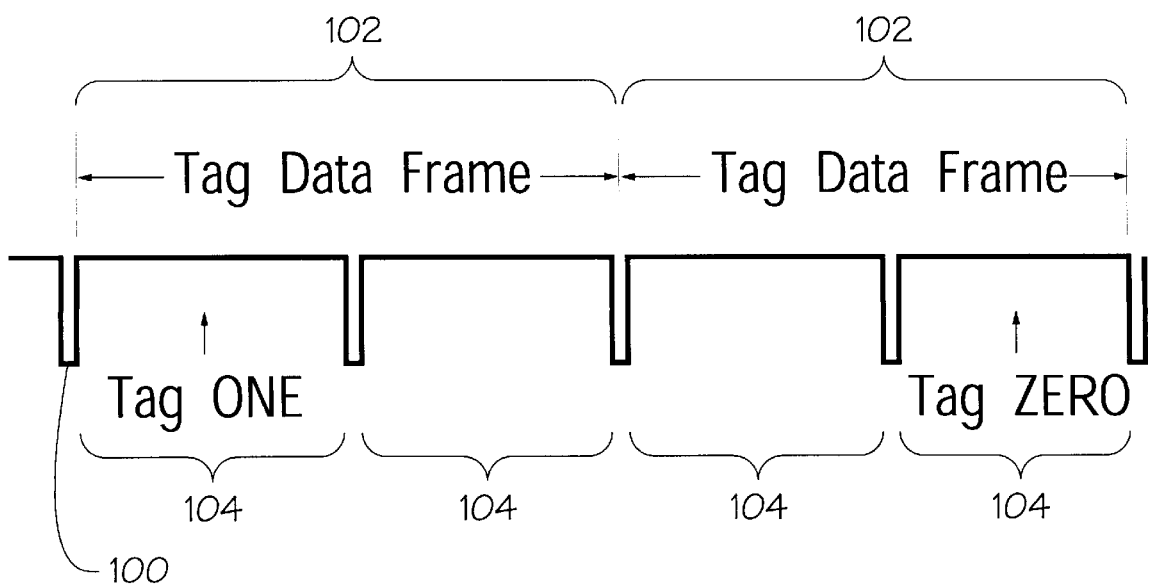
FIG. 5 is a diagrammatic waveform of the communication protocol from the RF/ID devices to the reader of FIG. 1.

In the communication from tags 10 to reader 14 the last data bit from reader 14 establishes the start 100 of a tag data frame 102. Each tag data frame 102 is measured as two reader defined synchronization periods 104. Tags 10 communicate data back to reader 14 by sending a reflected signal of duration $t_1$ in the appropriate segment of tag data frame 102 as illustrated in FIG. 5. A "one" is communicated as a return pulse in the first half of tag data frame 102 and a "zero" is communicated as a return pulse in the second half of tag data frame 102. Tags 10 return their data to reader 14, one bit in each tag data frame 102 until all data has been transmitted.

This communications protocol has the advantage that multiple responding tags 10 can be detected as long as their data differs. For example, assuming that each tag 10 has a unique identification number or stored digital information, there will be at least one bit stored in any two tags in which different values are different. Sooner or later one tag 10 will transmit a one and another will transmit a zero. This means that within some tag data frame 102 reader 14 will detect a bit in each half frame indicating that there are two or more responding tags in the field of interrogation. Although the data cannot be separated by reader 14 among a plurality of tags 10, reader 14 is aware that two or more tags 10 are active. After a first pass ID register 48 will be full and there should be only one tag 10 still active. All the bits, the word, of that tag are then reread and if at any bit position multiple tags are detected, then either there is an error in the communication or a new unread tag has entered the field of interrogation after the read and isolate process was initially begun. This word can be reread multiple times to insure that error has occurred. Upon the occurrence of a verified error register 48 is cleared, all tags 10 set AWAKE and NOT ISOLATED, and the process is then restarted anew.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a method for identifying each one of a plurality of radiofrequency-identification tags simultaneously interrogated on a single communication channel within a field of interrogation comprising the steps of:

activating said plurality of tags, each of said tags identified by a plurality of sequential bits; and interrogating a selected bit of said plurality of sequential bits of each of said plurality of tags to obtain a predetermined response from each of said tags having a predetermined bit value for said selected bit and upon receiving said predetermined response indicating at least one tag having said predetermined bit value then selectively deactivating each other one of said plurality of tags having a different bit value than said predetermined bit value for said selected bit, so that response from each of said deactivated tags to any interrogation is prohibited until one tag of said plurality of tags has been completely identified, otherwise if no tag which is present within said interrogation field responds to said interrogation to indicate said predetermined bit value, then no tag present within said field of interrogation is deactivated;

repeating said step of interrogating each of said sequential bits in said plurality of tags and said step of selectively deactivating said each other one of said plurality of tags until all of said sequential bits are obtained for at least one of said tags, so that said information is unambiguously obtained from said plurality of tags in said field of interrogation.

2. The improvement of claim 1 where said repeated steps of interrogating said activated tags comprises serially interrogating said activated tags to obtain in serial sequence a complete sequence of said sequential bits for a tag.

3. The improvement of claim 1 where said repeated steps of interrogating said activated tags comprises the steps of interrogating said activated tags to obtain in an arbitrary, nonserial sequence a complete sequence of said sequential bits for a tag.

4. The improvement of claim 1 further comprising the step of determining when said sequential bits have been completely interrogated from one of said plurality of tags and verifying said sequential bits, said method being restarted anew if verification fails.

5. The improvement of claim 1 where interrogating said activated tags while deactivating each other one of said tags having a different bit value than said predetermined bit value comprises simultaneously generating a response signal from those of said plurality of tags having said predetermined bit value, and deactivating all of said others of said plurality of tags not having said predetermined bit value.

6. The improvement of claim 1 where interrogating said activated tags while deactivating each of said tags having a different bit value than said predetermined bit value comprises first generating a response signal from those of said plurality of tags having said predetermined bit value, and subsequently deactivating others of said plurality of tags not having said predetermined bit value.

7. The improvement of claim 1 further comprising isolating each of said tags when said sequential bits are completely read from said tag to prevent said isolated tag's continued response to interrogation when unread ones of said plurality of tags are subsequently interrogated.

8. The improvement of claim 7 further comprising determining when said sequential bits have been completely interrogated from one of said plurality of tags and verifying said sequential bits, said method being restarted anew if verification fails.

9. The apparatus of claim 1 where said means for interrogating said activated tags generates a response signal from those of said plurality of tags having said predetermined bit value prior to deactivation of said plurality of tags not having said predetermined bit value.

10. The improvement of claim 1 where said step of deactivating comprises deactivating said other one of said plurality of tags having a different bit value than said predetermined bit value with a command signal of reduced bit length.

11. The improvement of claim 10 where said step of deactivating said other one of said plurality of tags having a different bit value than said predetermined bit value with a command signal of reduced bit length comprises deactivating said other one of said plurality of tags with a command of one bit length.

12. An apparatus for obtaining digital information from a plurality of radiofrequency-identification tags simultaneously interrogated on a single communication channel within a field of interrogation comprising:

means for activating said plurality of tags; and means for bitwise interrogating each of said plurality of tags for a bit value of a sequentially selected bit of said digital information in each tag, to obtain a bitwise predetermined response while;

means for deactivating, with each interrogation, each of said tags present within said field of interrogation having a different bit value than a predetermined bit value for said sequentially selected bit, said deactivated tag being prohibited from responding to further interrogation, otherwise if no tag present within said field of interrogation responds to said interrogation to indicate said predetermined bit value, no tag present within said field of interrogation is deactivated, said sequentially selected bit being indexed until all of said digital information is identified in one of said plurality of tags present within said field of interrogation, all of said other ones of said plurality of tags present within said field of interrogation being deactivated, said deactivated tags present within said field of interrogation not further responding to any interrogation until all of said digital information is identified in said one of said plurality of tags present within said field of interrogation, so that said information is unambiguously obtained from said plurality of tags in said field of interrogation.

13. The apparatus of claim 12 where said means for bitwise interrogating said activated tags comprises means for serially bitwise interrogating said activated tags in an ordered sequence.

14. The apparatus of claim 12 where said means for bitwise interrogating said activated tags comprises means for arbitrarily bitwise interrogating said activated tags in an order other than an ordered sequence without repeating an interrogation of any given bit of said digital information.

15. The apparatus of claim 12 further comprising means for determining when said digital information has been completely interrogated from one of said plurality of tags and for verifying said digital information, said means for interrogating said activated tags being restarted anew if verification fails.

16. The apparatus of claim 12 where said means for interrogating said activated tags simultaneously generates a response signal in those of said plurality of tags having said predetermined bit value with deactivation of said plurality of tags not having said predetermined bit value.

17. The apparatus of claim 12 further comprising means for isolating each of said tags when said digital information is completely read from said tag to prevent its continued response to interrogation from said read tag when unread ones of said plurality of tags are subsequently interrogated.

18. A system for communicating with a plurality of tags within a field of interrogation on a single communication frequency wherein said plurality of tags communicate in response to interrogation during said same time period, wherein each of said plurality of tags can be set in an activated AWAKE state or deactivated into a SLEEP state in which response by said tag in said SLEEP state is prohibited until a tag in said field has been completely identified, wherein each of said tags contains digital information, and wherein each of said tags can be set in two distinguishable states, an ISOLATED state and NOT ISOLATED state in which response by said tag in said ISOLATED state is prohibited until all tags in said field have been completely identified, said system comprising:

first means for setting all of said tags which are in said NOT ISOLATED state into said activated AWAKE state;

second means for interrogating each bit in said digital information stored within each of said tags in said activated AWAKE state to determine if said interrogated bit has a predetermined logic value, and if so to cause each tag to generate a predetermined response if said bit has said predetermined value and otherwise to place said tag in said SLEEP state;

third means for bitwise accumulating said predetermined responses and lack of said predetermined responses by bit-by-bit reading said digital information from one of said plurality of tags; and fourth means for placing each said tag from which said digital information has been bitwise completely read into said ISOLATED state so that subsequent operation of said second and third means reads each unique codification of said digital information contained within each of said plurality of tags within said field of interrogation.

19. The system of claim 18 where said second means generates two separate sequential commands to generate said predetermined response from selected ones of said tags and to deactivate other ones of said tags.

20. The system of claim 18 where said second means generates a single command to simultaneously generate said predetermined response from selected ones of said tags and to deactivate other ones of said tags.

21. A method for interrogating a plurality of RF/ID tags in a single field of interrogation wherein said RF/ID tags communicate on a single frequency during at least overlapping time periods comprising the steps of:

bitwise interrogating each of said plurality of tags to determine if any one of said plurality of tags has a predetermined logic value in a predetermined one of a sequence of bit positions;

deactivating each of said tags not having said predetermined logic value in said predetermined one of said sequential bit positions, so that said deactivated tags are prohibited from responding to any interrogation until a tag has been completely identified;

repeating said steps of interrogating and deactivating said plurality tags until only one tag remains activated;

obtaining information from said only one activated tag;

isolating said one activated tag after said information is obtained therefrom, so that said isolated tag is prohibited from responding to any interrogation until all tags within said field have been completely identified; and repeating each of said foregoing steps for all tags not isolated until complete information has been read from each of said plurality of tags within said field of interrogation.

22. A method for interrogating a plurality of RF/ID tags in a single field of interrogation wherein said RF/ID tags communicate on a single frequency during at least overlapping time periods with a single reader comprising the steps of:

transmitting a train of synchronization pulses from said reader to said tags, each said synchronization pulse in said train of synchronization pulses having a predetermined pulse width, $t_1$, said train of synchronization pulses being repeated in a subsequent train of synchronization pulses after a predetermined period, $t_2$;

transmitting reader digital data from said reader to said plurality of tags by transmitting a selected number of synchronization pulses in said train of synchronization pulses, each with a predetermined pulse separation of $t_3$; and transmitting digital data from said plurality of tags to said reader by selectively transmitting a tag data pulse in a selected half of a tag data frame defined by two consecutive synchronization pulses transmitted by said reader.

23. The method of claim 22 wherein transmitting a train of synchronization pulses is defined by ceasing the transmission of a signal from said reader to said tags for said predetermined pulse width, $t_1$, and repeating said cessation after said predetermined period, $t_2$.

24. The method of claim 22 wherein transmitting tag digital data from said plurality of tags to said reader comprises transmitting said tag digital data after the last of said reader digital data is transmitted from said reader to said tags, said last reader digital data establishing the beginning of said tag data frame, two of said synchronization pulses defining a first and second half of said tag data frame, said tag data being transmitted to said reader from said tag by a pulse of width $t_1$ during either said first or second half of said tag data frame to indicate a logical binary value.

* * * * *